Figure 1:
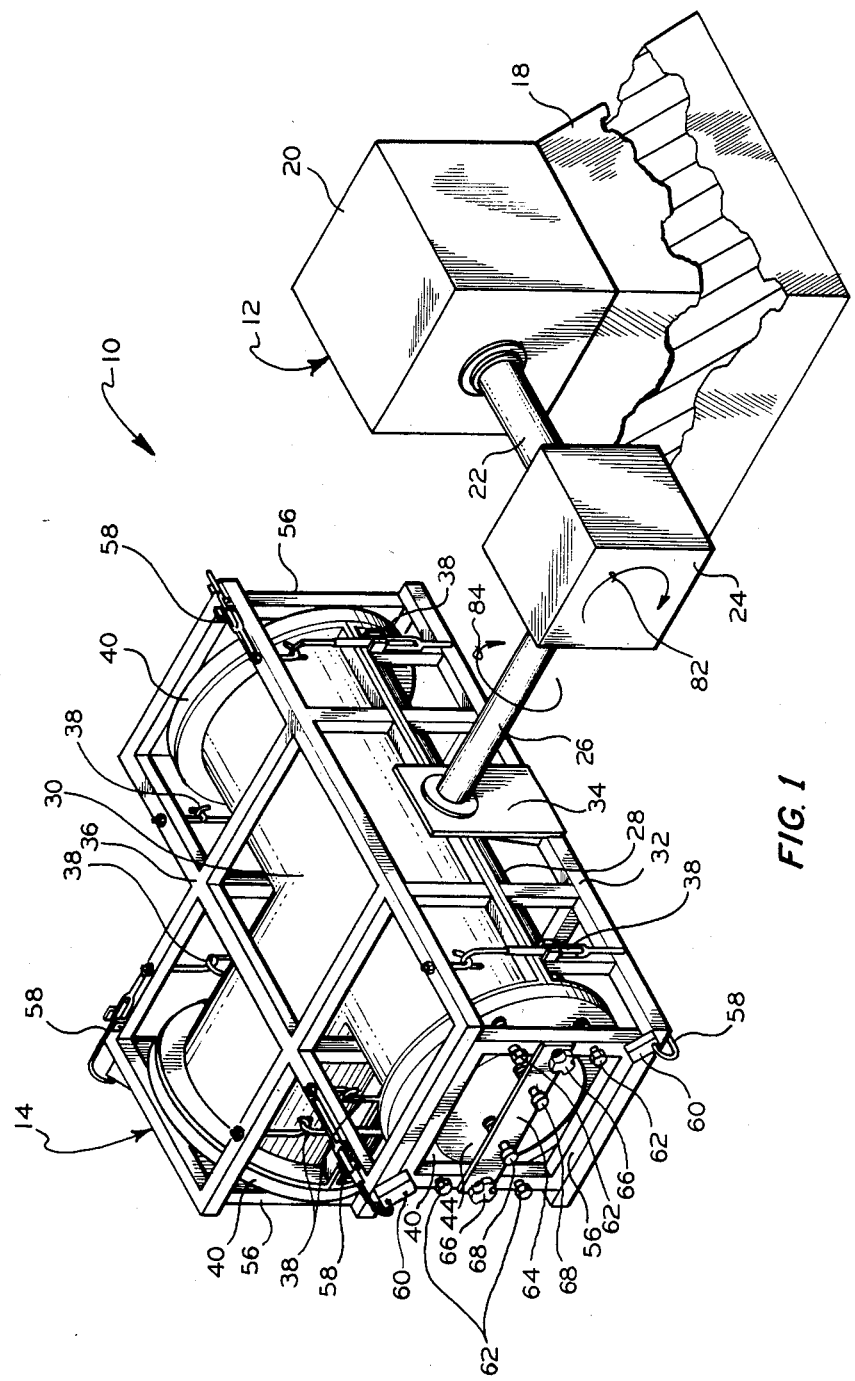

United States Patent [19]

Carrow

[11] Patent Number: 4,666,650
[45] Date of Patent: May 19, 1987

[54] METHOD AND APPARATUS FOR MOLDING HOLLOW ARTICLES

[75] Inventor: Guy E. Carrow, Bartlesville, Okla.

[73] Assignee: Phillips Petroleum Company, Bartlesville, Okla.

[21] Appl. No.: 521,761

[22] Filed: Aug. 9, 1983

[51] Int. Cl.[4] ............................................. B29C 41/06
[52] U.S. Cl. ...................................... 264/310; 425/429
[58] Field of Search ................................ 264/310, 311

[56] References Cited

U.S. PATENT DOCUMENTS

| | | | |
|---|---|---|---|
| 1,480,740 | 1/1924 | Barkschat | 264/311 |
| 2,659,107 | 11/1953 | DeBell | 18/58.3 |
| 3,200,184 | 8/1965 | Schulze | 264/311 |
| 3,214,506 | 10/1965 | Corbin | 264/310 |
| 3,237,247 | 3/1966 | Eggert et al. | 18/26 |
| 3,337,662 | 8/1967 | Spencer | 264/71 |
| 3,391,823 | 7/1968 | Tijms | 220/83 |
| 3,666,528 | 5/1972 | Barnhardt | 117/49 |
| 3,683,062 | 8/1972 | von der Heide | 264/310 |
| 3,875,275 | 4/1975 | Lemelson | 264/45.3 |
| 3,938,928 | 2/1976 | Andrews | 425/430 |
| 3,943,212 | 3/1976 | Szatkowski | 264/24 |
| 3,989,787 | 11/1976 | Scott, Jr. | 264/310 |
| 3,997,649 | 12/1976 | Pivar | 264/310 |
| 4,129,282 | 12/1978 | Scott et al. | 249/137 |

FOREIGN PATENT DOCUMENTS 2064175  7/1972  Fed. Rep. of Germany .

OTHER PUBLICATIONS

Modern Plastics Encyclopedia, 1967, vol. 44, No. 1A, Sep., 1966, pp. 780–784 and 862.

*Primary Examiner*—James Derrington
*Attorney, Agent, or Firm*—French and Doescher

[57] ABSTRACT

A method of rotationally molding hollow articles from cross-linkable polymeric material wherein the mold and molding material are simultaneously revolved about two nonparallel axes while being heated to fuse and cross-link polymeric material. When the polymeric material is partially cross-linked the mold containing the hollow article is opened at at least one location to admit heated air circulated therethrough to facilitate cross-linking of the inner portion of the molded tubular article and produce a smooth inner surface therein. Also disclosed is apparatus for performing the molding method of the invention.

18 Claims, 3 Drawing Figures

METHOD AND APPARATUS FOR MOLDING HOLLOW ARTICLES

The present invention relates generally to the molding of hollow articles. In one aspect the invention relates to a method of rotationally molding cross-linkable polymeric material into a hollow article. In another aspect the invention relates to apparatus for rotationally molding cross-linkable polymeric material into a hollow article. In still another aspect the invention relates to the product produced by a method of rotationally molding cross-linkable polymeric material into a hollow article.

In recent years tubular articles such as pipes and pipe fittings have increasingly been manufactured from synthetic polymeric materials. Such materials include polyolefin materials such as high density polyethylene. Pipe can be ecomomically manufactured from such materials by means of extrusion. Pipe fittings, such as, for example, tees, wyes, elbows, valve bodies and the like, have been produced by injection-molding in order to produce the relatively complex shapes of such fittings. It is well known, however, that injection-molding is an expensive process due to the tooling costs involved in designing and machining the dies required to form such injection-molded parts. Economics generally dictates that a large number of injection-molded parts must be produced by a particular die in order to satisfactorily amortize the tooling costs incurred in its design and construction. The size of a part to be injection-molded is also of primary importance since tooling costs for injection-molding dies increase greatly as the size of the article to be molded increases. In the specific case of molded plastic pipe fittings, fittings having a nominal diameter of up to about 8 inch can be economically produced by injection-molding. However, those fittings having nominal diameters from about 8 inch up to about 48 inch and larger, and having nominal wall thicknesses of up to about 1½ inch and larger, are generally produced by other, more economical means.

One technique which can be used to produce large hollow or tubular articles from synthetic polymeric material is known as rotational molding. In this technique, a mold having a cavity defining the outer surface of the article to be formed there in is mounted for ratation and/or revolution about one or more axes of rotation. Cross-linkable or thermosetting polymeric material is introduced into the mold and it is simultaneously heated and rotated and/or revolved about the one or more axes of rotation to fuse the polymeric material and distribute it more or less equally over the inside surface of the mold cavity to form the wall of the hollow article.

In the rotational molding of hollow articles from cross-linkable polymeric materials, it has been found that the interior surfaces of such articles so molded often do not exhibit the smoothness desired for the required utility of the article. Examples of articles which require maximum smoothness of the inner surfaces thereof are molded pipe fittings such as tees, wyes, elbows, valve bodies and the like. It is believed that the lack of desired inner surface smoothness in such articles, especially those articles having relatively thick walls, is attributable to difficulty in achieving the desired uniformity of cross-linking or curing from the outer surface to the inner surface of the article from an externally heated rotational mold.

Accordingly, it is an object of the present invention to provide method and apparatus for rotationally molding large-size hollow articles having relatively thick walls.

Another object of the present invention is to provide improved smoothness of the interior surfaces of rotationally molded tubular articles.

Yet another object of the present invention is to enhance the curing of cross-linkable polymeric material in the rotational molding of tubular articles.

Still another object of the present invention is to produce pipe fittings of relatively large diameter and relatively thick walls.

Another object of the present invention is to provide method and apparatus for rotationally molding relatively large, generally tubular articles having relatively thick walls, which method and apparatus are simple, reliable efficient and economical in operation.

A further object of the present invention is to provide a molded tubular article of moldable plastic material which is characterized by smooth interior wall surfaces and relatively low cost.

The present invention contemplates a method of molding an article from melt-fusible and cross-linkable plastic material, which article is characterized by at least one generally tubular sidewall. The method includes providing a mold having a cavity generally corresponding to the shape of the article and defining at least one generally tubular sidewall. The mold is further characterized by at least one removable plug closing the mold at least one extremity of at least one of the thus defined generally tubular sidewalls. The method further include depositing a quantity of the plastic material within the mold, and placing the at least one removable plug in the mold to close the mold at the respective extremity of the thus defined tubular sidewall. The mold is then revolved about at least two nonparallel rotational axes. The mold and the material contained therein are heated to a temperature suitable for fusing the material and for a time sufficient to partially cross-link the material in the desired form of the hollow article. The at least one removable plug is thereafter removed from the mold to expose the interior of the mold to the heating, and the heating of the mold and the material contained therein is continued after removing the at least one removable plug for an additional time sufficient to achieve the desired degree of cross-linking of the plastic material in the desired form of the article. The thus cross-linked hollow article is allowed to cool and the thus cooled hollow article is recovered from the mold. The present invention further contemplates articles manufactured in accordance with the method.

The present invention additionally contemplates apparatus for producing a hollow article which includes a mold assembly having a cavity therein generally corresponding to the exterior shape of the article to be produced and having at least one portion defining a generally tubular sidewall of the article. The mold assembly is characterized by an aperture therein communicating with the interior thereof at the extremity of the portion defining the generally tubular sidewall of the article. The apparatus further includes plug means for closing the aperture in the mold assembly, and, alternately, for opening the aperture, as well as means for securing the plug means in position closing the aperture in the mold assembly. The apparatus is additionally provided with means secured to the mold assembly for revolving the mold assembly about at least two nonparallel axes of rotation. The apparatus also includes means for heating the mold assembly and the contents of the cavity therein.

Figure 2:
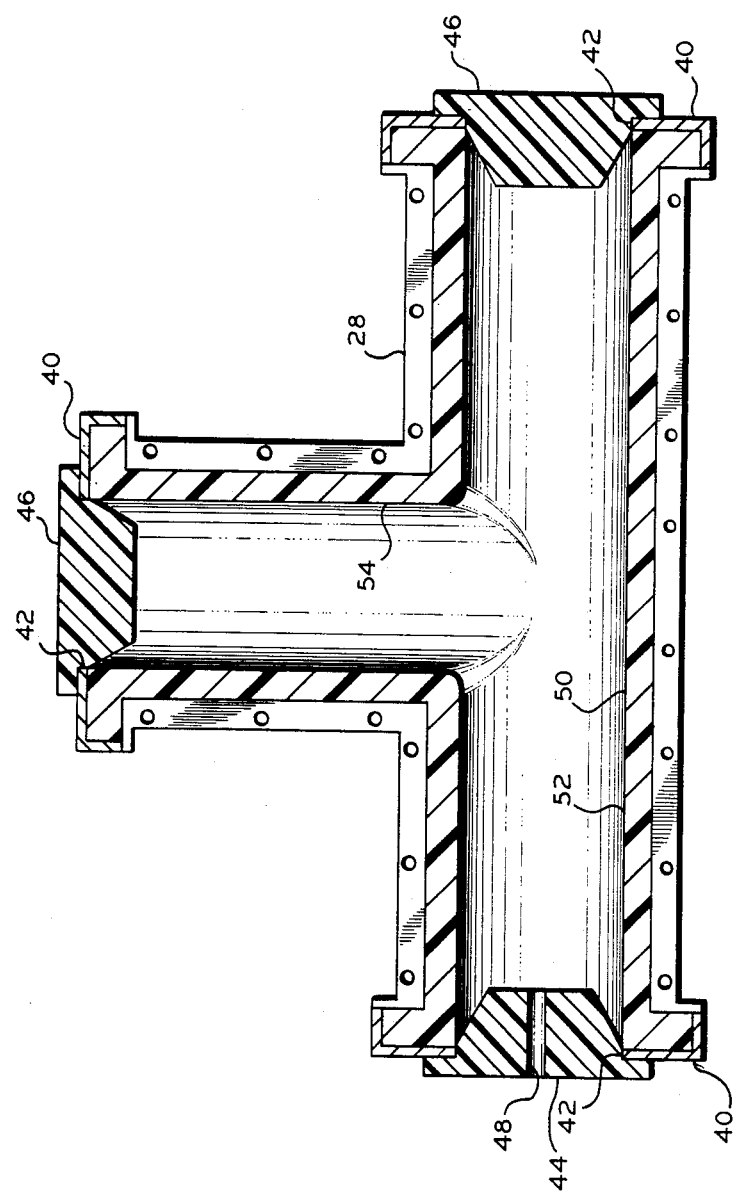
Figure 3:
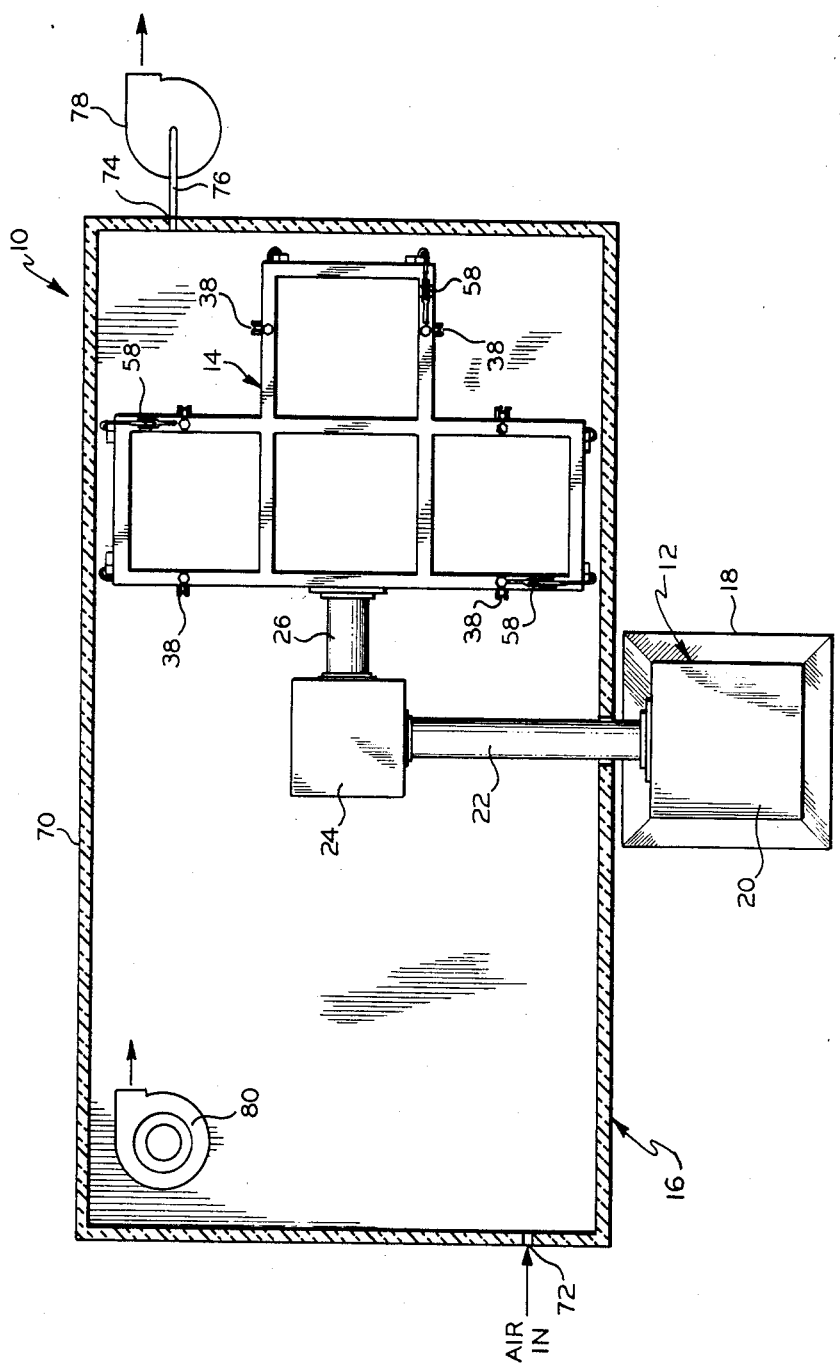

Others aspects, objects, advantages and features of the present invention will become apparent to those skilled in the art to which the present invention pertains upon a reading of the remainder of this specification and the claims appended thereto with reference to the accompanying drawings in which:

FIG. 1 is an isometric view of a mold carried by a mold-supporting device and apparatus for simultaneously revolving the mold about two nonparallel axes;

FIG. 2 is a cross sectional view of the mold of the present invention showing the molded article in place therein and showing the removable insulated plugs positioned within extremities of the tubular sidewalls of a molded article; and FIG. 3 is a top plan partically in cross-section view illustrating the apparatus of FIG. 1 with a mold and mold-supporting device disposed within an oven, with the top portion of the oven broken away to more clearly illustrate the construction of the apparatus.

Referring now to the drawings, the apparatus of the present invention is generally designated by the reference character 10. The apparatus 10 includes a mold support and drive assembly 12, a mold assembly 14 and a mold heating assembly 16.

The mold support and drive assembly 12 includes a support pedestal 18, a drive unit 20 mounted on the upper end of the support pedestal 18, and an output shaft subassembly 22 drivingly secured to and supported by the drive unit 20. The outer end portion of the output shaft subassembly 22 is drivingly secured to and provides support for a power transmission unit 24. A power output shaft 26 is drivingly secured to the power transmission unit 24 and is support by the power transmission unit.

The mold assembly 14 includes a lower mold section 28 and an upper mold section 30. The lower mold section 28 is secured to and supported by a lower mold support frame 32 which is fixedly secured to the outer end of the power output shaft 26 by means of a mounting plate 34 which is fixedly secured to the lower mold support frame 32. The upper mold section 30 is secured to and supported by an upper mold support frame 36. The upper and lower mold sections 30 and 28 are secured together to define the cavity therein generally corresponding to the exterior shape of the article to be produced by means of a plurality of hook-type, toggle action pull clamps 38 located at space locations about the exterior of the thus joined mold sections 30 and 28. With the upper and lower mold sections 30 and 28 thus secured together, the mold assembly 14 further includes a mold end plate 40 positioned about each open extremity of the cavity defined by the joined upper and lower mold sections. Each of the mold end plates 40 is provided with an aperture 42 therein. Mold assembly 14 additionally includes removable mold plugs 44 and 46, each disposed in a respective aperture 42. The mold plug 44 differs from the mold plug 46 in the inclusion of a vent hole 48 therein to vent the interior of the mold cavity during the molding process.

Referring now to FIG. 2, the mold assembly 14 is partially shown in cross-section along the parting line between the lower mold section 28 and the upper mold section 30, the upper mold section being removed to more clearly illustrate the structure of the mold assembly. It will be seen that the mold assembly 14 forms a cavity which defines a hollow article 50 in the form of a pipe tee. Such an article is characterized by a pair of tubular sidewalls 52 and 54, the axes of which are nonparallel and are actually perpendicular to one another. The mold end plates 40 define flanges at the extremities of the side-walls 52 and 54. The removable mold plugs 44 and 46 are sized and shaped to be closely received within the apertures 42 and to direct the material to be molded into the adjacent flange portions of the cavity during the molding process. The upper and lower mold sections 30 and 28 are preferably made of metal having relatively high thermal conductivity and having a minimum wall thickness commensurate with the strength required to support the material to be molded within the cavity. Similarly the mold end plates 40 are also preferably formed by the same type of metallic material. The removable mold plugs 44 and 46 are preferably formed of relatively thick, thermal insulating material which does not readily conduct heat from the exterior of the mold to the material to be molded within the cavity. Suitable materials for the construction of the mold sections 20 and 30 include steel and aluminum with aluminum being presently preferred. Suitable material for the construction of the mold plugs 44 and 46 include various synthetic resinous materials which maintain their physical intregity when subjected to the molding temperatures involved in the practice of the instant process. A presently preferred material for construction of the mold plugs is poly(phenylene sulfide) which is sold under the registered trademark RYTON by Phillips Petroleum Company.

The mold assembly 14 further includes a plurality of mold end support frames 56 each disposed adjacent a respective mold end plate 40. The mold end support frames 56 are each supported on the upper and lower mold support frames 36 and 32 by means of a pair of hook-type, toggle action pull clamps 58 mounted on respective mold support frames and engagable with a corresponding lug 60 mounted on the corresponding mold end support frame 56. A plurality of spring-loaded bolts 62 are threadedly secured through each mold end support frame 56 and yieldably engage the corresponding adjacent mold end plate 40 to secure the mold end plate 40 to the open extremity of the joined upper and lower mold sections 30 and 28. Each mold end support frame 56 further includes a mold plug retainer plate 64 which is secured across the central portion of each mold end support frame 56 by means of a pair of hand-operated thread retainer bolts 66. The mold plugs 44 and 46 are removably retained in position within the apertures 42 of corresponding end plates 40 by means of a pair of spring loaded threaded bolts 68 which are threadedly secured through the respective mold plug retainer plate 64 to yieldably urge the mold plugs 44 and 46 into the respective apertures 42. The hand-operated threaded retainer bolts 66 facilitate the quick and convenient removal of the mold plug retainer plates 64 and the coresponding mold plugs 44 and 46 from the mold assembly 14 during the operation of the apparatus 10.

The mold heating assembly 16 includes an oven housing 70 which fully encloses the mold assembly 14, the power transmission unit 24, the power output shaft 26, and the outer end portion of the output shaft subassembly 22. The oven housing 70 is provided with a makeup air inlet 72 and an exhaust outlet 74 which is connected via conduit 76 to a suitable exhaust blower 78. The mold heating assembly 16 additionally includes a circulation blower 80 disposed within the oven housing 70 for vigorously circulating the air within the mold heating assembly 16 to circulate hot air within the oven housing 70 and thereby increasing the efficiency of the molding process of the present invention.

In the operation of the apparatus 10, the mold assembly 14 is assembled as described above and is charged with a predetermined amount of particulate thermosetting or cross-linkable polymeric material sufficient to provide a molded article of the desired wall thickness. One of the mold plugs 44 or 46 can be removed from the mold assembly 14 to facilitate the charging of the particulate molding material and then can be conveniently replaced after the mold assembly is fully charged. The oven housing 70 is then closed about the thus charged mold assembly 14 and oven heating is initiated along with the operation of the blowers 78 and 80. The mold support and drive assembly 12 is also actuated to begin revolving the mold assembly 14 about the axis of rotation of the output shaft subassembly 22 in the direction of the arrow 82, as shown in FIG. 1. Through the action of the power transmission unit 24, the thus revolving mold assembly 14 is rotated about the axis of rotation of the power output shaft 26 in the direction of the arrow 84. It will be seen that this action by the mold support drive assembly 12 causes the mold assembly 14 to be simultaneously revolved about the two nonparallel axes. In a preferred embodiment, illustrated in the drawings, the axes of rotation about which the mold assembly 14 is revolved are parallel to the axes of the corresponding tubular sidewalls 52 and 54 of the hollow article 50 to be molded. The mold heating assembly 16 can be operated at any temperature which will provide the desired melt fusion and cross-linking of the polymeric material disposed within the mold assembly 14. In general, the operating temperature of the mold heating assembly is in the range from about 350° F. to about 500° F.

The mold assembly 14 is preferably simultaneously revolved about the two nonparallel axes in the circulating hot air within the mold heating assembly 16 at the desired temperature until such time as the polymeric material within the mold assembly 14 has fused and formed the molded article while achieving a degree of cross-linking which varies from a higher degree in the material near the mold surface to a lesser degree in the material toward the interior of the sidewall. This condition is typically achieved when the polymeric material has gained such a degree of physical stability that the motion of the mold assembly 14 can be stopped for a short period of time to remove the mold plugs 44 and 46 from their respective apertures 42 in the mold end plates 40. The heating prior to the removal of the mold plugs 44 and 46 can be performed for any period of time adequate to achieve the desired partial cross-linking. However, the period of time generally falls in the range from about 2 hours to 5 hours. Upon removal of the mold plugs 44 and 46, the revolution of the mold assembly 14 within the heated mold heating assembly 16 is continued with hot air being circulated both around and through the open mold assembly 14 until the desired complete cross-linking of the polymeric material is achieved at which time heating by the mold heating assembly 16 is stopped and the molded article within the mold assembly 14 is allowed to cool for a time sufficient to allow the mold to be disassembled and the article to be removed therefrom in its completed form. The cooling step will continue for a period of time sufficient to achieve the desired integrity of the molded article, however, cooling of the molded article within the mold assembly 14 is generally performed for a time in the range from about 17 minutes to about 25 minutes depending on the size of the molded article and other parameters. Cooling can be achieved by circulating ambient or cooled air through the mold assembly 14 while maintaining the simultaneous rotation of the mold assembly 14 about the nonparallel axes of rotation. Cooling can also be achieved by circulating water-laden air or a fog through the revolving mold assembly 14. It is also within the scope of this invention to perform cooling by the application of water to the molded article to facilitate the cooling.

In a variation of the process of the present invention, the mold assembly 14 can be initially charged with a fractional portion of polymeric material necessary to mold a completed hollow article. Upon sufficient fusion and partial cross-linking of the initial charge of polymeric material, an additional charge of polymeric material can be added to the interior of the mold assembly 14 and the heating to fusion and cross-linking can be continued. The addition of fractional portions of the polymeric material followed by additional fusion and cross-linking can be continued until the full desired amount of polymeric material has been charged to the mold assembly. Upon the desired partial cross-linking of the last charge of polymeric material, the mold plugs 44 and 46 can be removed as described above followed by the previously described additional heating or curing of the polymeric material and cooling of the thus molded hollow article. Upon the desired cooling of the molded hollow article, the completed article is then recovered from the mold assembly 14 by releasing the pull clamps 38 and 58 and parting the mold sections 30 and 32.

While it is not desired to limit the scope of the present invention to the employment of any particular molding material, the method and apparatus of the present invention are advantageously employed in the molding of cross-linking or thermosetting polymeric materials. Such materials are generally heat fusible, and are preferably charged to the mold assembly 14 in a powdered condition to facilitate heat transfer to the polymeric materials and to eliminate or sharply reduce the possibility of the incidence of bubbles in the molded article. The presently preferred heat fusible, cross-linkable polymeric materials for use in the method and apparatus of the present invention include cross-linkable polyolefins, and mixtures or copolymers thereof. The presently preferred cross-linkable polyolefin for use in the present invention is cross-linkable polyethylene. For example, Marlex CL-100, a cross-linkable polyethylene sold by Phillips Chemical Company of Bartlesville, Okla., is a suitable material.

EXAMPLE I

A series of fifteen runs was made in which five pipe tees, each having a nominal diameter of 18 inches, and 10 pipe tees, each having a nominal diameter of 8 inches, were produced using Marlex CL-100 in mold apparatus as described above and illustrated in the drawings. The 18 inch pipe tees produced in runs 1–4 and the 8 inch pipe tees produced in runs 6 and 7 did not employ the removable mold plugs of the present invention and all heating was applied to the exterior of the mold. The 18 inch pipe tee of run 5 and the 8 inch pipe tees of runs 18–15 were produced utilizing the removable mold plugs of the present invention with circulating heated air being applied to the tees both before and after removal of the mold plugs. Runs 3 and 4 were each characterized by two separate changes of cross-linkable polyethylene to build up the desired wall thickness of the pipe tees. Oven temperatures ranged from 350° F. to 500° F. during molding of the tees. After completion of each heating cycle the mold containing the cross-linked polymer tee was removed from the heating oven and rotated about its nonparallel axes in a cooling chamber where it was subjected to air cooling for from about 10 to about 15 minutes, fog cooling with water vapor laden air for from 0 to about 15 minutes, and liquid water cooling from 0 to about 10 minutes. Each thus cooled pipe tee was then removed from the mold apparatus and subjected to a destructive burst test and the observed burst pressure recorded. The results of these 15 runs are shown in Table I.

article has at least one aperture therein through which heated air can be circulated to facilitate the curing or cross-linking of the interior surface of the tubular article during the molding thereof. The method and apparatus of the present invention provide the advantages of more in iniform curing or cross-linking of the sidewalls of the molded hollow article, smoother interior surfaces of the molded hollow articles and reduced heating time to achieve the necessary cross-linking of the polymeric material through the full thickness of the sidewalls of the hollow article.

Changes may be made in the combination and arrangement of parts, elements or method steps as heretofore set forth in the specification and shown in the drawings without departing from the spirit and scope of the invention as defined and limited only in the following claims.

TABLE I

| Run | Nominal Tee Dia, Inch | Mold Plugs | Polymer Wt., (lb) | Oven Temp., (°F.) | Heating Cycle Time w/Plugs | Heating Cycle Time w/out Plugs | Cooling Time, (min) Air | Cooling Time, (min) Fog | Cooling Time, (min) Water | Burst Pressure, (psig) |
|---|---|---|---|---|---|---|---|---|---|---|
| 1 | 18 | No | 120 | 500 | 1 hr | | 10 | 0 | 8 | 290 |
| | | | | 400 | 4 hrs | | | | | |
| 2 | 18 | No | 120 | 350 | 1 hr | | 10 | 0 | 10 | 260 |
| | | | | 400 | 2 hr | | | | | |
| | | | | 425 | 45 min | | | | | |
| | | | | 450 | 15 min | | | | | |
| | | | | 475 | 30 min | | | | | |
| | | | | 500 | 30 min | | | | | |
| 3 | 18 | No | 85$^{(a)}$ | 500 | 50 min | | 10 | 0 | 8 | 300 |
| | | | 30$^{(a)}$ | 400 | 4 hrs | | | | | |
| 4 | 18 | No | 85$^{(b)}$ | 500 | 30 min | | 10 | 0 | 8 | 300 |
| | | | 35$^{(b)}$ | 400 | 45 min | | | | | |
| | | | | 400 | 45 min | | | | | |
| 5 | 18 | Yes | 130 | 400 | 5 hrs | 1 hr | 15$^{(c)}$ | 10$^{(c)}$ | 0$^{(c)}$ | 370 |
| | | | | 400 | | | | | | |
| 6 | 8 | No | 24 | 400 | 3 hrs | | 10 | 5 | 2 | 475 |
| 7 | 8 | No | 24 | 400 | 3¼ hrs | | 10 | 5 | 2 | 460 |
| 8 | 8 | Yes | 24 | 400 | 2 hrs | 45 min | 10$^{(c)}$ | 15$^{(c)}$ | 0$^{(c)}$ | 500 |
| | | | | 400 | | | | | | |
| 9 | 8 | Yes | 24 | 400 | 2 hrs | 45 min | 15$^{(c)}$ | 5$^{(c)}$ | 0$^{(c)}$ | 420 |
| | | | | 400 | | | | | | |
| 10 | 8 | Yes | 24 | 400 | 2 hrs | 45 min | 15$^{(c)}$ | 5$^{(c)}$ | 0$^{(c)}$ | 500 |
| | | | | 400 | | | | | | |
| 11 | 8 | Yes | 24 | 425 | 2½ hrs | 30 min | 10$^{(c)}$ | 5$^{(c)}$ | 2$^{(c)}$ | 650 |
| | | | | 425 | | | | | | |
| 12 | 8 | Yes | 24 | 400 | 2¼ hrs | 45 min | 10$^{(c)}$ | 5$^{(c)}$ | 5$^{(c)}$ | 450 |
| | | | | 400 | | | | | | |
| 13 | 8 | Yes | 24 | 400 | 2 hrs | 30 min | 10$^{(c)}$ | 5$^{(c)}$ | 5$^{(c)}$ | 450 |
| | | | | 400 | | | | | | |
| 14 | 8 | Yes | 24 | 400 | 2 hrs | 45 min | 10$^{(c)}$ | 5$^{(c)}$ | 5$^{(c)}$ | 420 |
| | | | | 400 | | | | | | |
| 15 | 8 | Yes | 24 | 400 | 2 hrs | 45 min | 10$^{(c)}$ | 15$^{(c)}$ | 0$^{(c)}$ | 500 |
| | | | | 400 | | | | | | |

$^{(a)}$Two sequential polymer charges, total weight 115 lb.
$^{(b)}$Two sequential polymer charges, total weight 120 lb.
$^{(c)}$Cooling performed with mold plugs removed.

From the data in Table I it will be seen that the use of the removable mold plugs reduced the heating cycle time of inventive runs 8–15 for production of 8 inch pipe tees in comparison to control run 7, and reduced the heating cycle time of inventive runs 8–10 and 13–15 in comparison with control run 6. The heating cycle time of each inventive runs 11 and 12 was equal to the heating cycle time of control run 6. Inventive runs 8, 10, 11 and 15 all exhibited burst pressures exceeding either of the burst pressures exhibited by control runs 6 and 7. Inventive run 5 for the production of an 18 inch pipe tee produced a percentage increase in burst pressure over control runs 1–4 in the range from about 23.3% to about 42.3%. All pipe tees produced in inventive runs 5 and 8–15 exhibited smooth interior surfaces and little or no out of roundness.

It will be understood that the method and apparatus of the present invention are broadly applicable to the molding of any hollow article in which the finished

I claim:
1. A method of molding a hollow article from melt fusible and cross-linkable plastic material, said article having at least one tubular sidewall comprising:
   (a) providing a mold having a cavity generally corresponding to the shape of said article and defining said at least one generally tubular sidewall and having at least one removable plug closing said mold at at least one extremity of at least one of said thus defined generally tubular sidewalls;
   (b) depositing a quantity of said plastic material within said mold;
   (c) placing said at least one removable plug in said mold to close said mold at the extremity of a thus defined tubular sidewall;

(d) simultaneously revolving said mold about at least two nonparallel rotational axes;

(e) heating said mold and said material contained therein to a temperature suitable for fusing said material and for a time sufficient to partially cross-link said material in the desired form of said hollow article;

(f) removing said at least one removable plug from said mold to expose the interior of said mold to heating;

(g) continuing the heating of said mold and said material after removing said at least one removable plug for an additional time sufficient to achieve the desired degree of cross-linking of said material in the desired form of said hollow article;

(h) allowing said thus cross-linked hollow article to cool; and (i) recovering said thus cooled hollow article from said mold.

2. A method in accordance with claim 1 wherein said material comprises a cross-linkable polyolefin.

3. A method in accordance with claim 1 wherein said material comprises cross-linkable polyethylene.

4. A method in accordance with claim 1 wherein said heating steps (e) and (g) are performed at a temperature in the range from about 350° F. to about 500° F.

5. A method in accordance with claim 1 wherein said heating step (g) includes circulating hot air both around the mold and through the mold cavity.

6. A method in accordance with claim 5 wherein said heating step (e) includes circulating hot air around said mold.

7. A method in accordance with claim 1 wherein said heating step (e) is performed for a time in the range from about 2 hours to about 5 hours, and wherein said heating step (g) is performed for a time in the range from about 30 minutes to about 1 hour.

8. A method in accordance with claim 1 wherein said hollow article is allowed to cool in step (h) for a time in the range from about 17 minutes to about 25 minutes.

9. A method in accordance with claim 1 wherein said hollow article is cooled in step (h) by contacting said article with air.

10. A method in accordance with claim 1 wherein said hollow article is cooled in step (h) by contacting said article with air ladened with water vapor.

11. A method in accordance with claim 1 wherein said hollow article is cooled in step (h) by contacting said article with water.

12. A method in accordance with claim 1 wherein said hollow article is cooled in step (h) by sequentially contacting said article with air, air laden with water vapor, and water.

13. A method in accordance with claim 1 wherein said hollow article is cooled in step (h) by sequentially contacting said article (1) with air for a time in the range from about 10 minutes to about 15 minutes, (2) with air laden with water vapor for a time in the range from about 5 minutes to about 15 minutes, and (3) with water for a time in the range from about 2 minutes to about 10 minutes.

14. A method in accordance with claim 1 wherein steps (b) through (e) are repeated until a sufficient quantity of said material has been deposited within said mold to provide the desired thickness of said tubular sidewalls of said hollow article.

15. A method in accordance with claim 1 wherein said mold has a cavity defining a pipe tee.

16. A method in accordance with claim 1 wherein said mold has a cavity defining at least two generally circular tubular sidewalls having nominal diameters of at least about 8 inches.

17. A method in accordance with claim 1 wherein said article has at least two tubular sidewalls, in the axes of said two of said at least two tubular sidewalls are not parallel.

18. A method in accordance with claim 17 wherein step (d) is further characterized in that each said rotational axis is generally parallel to a corresponding axis of one of said tubular sidewalls.

* * * * *